(12) United States Patent
Yoon et al.

(10) Patent No.: US 8,448,201 B2
(45) Date of Patent: May 21, 2013

(54) INTEGRATED DISK DRIVING MODULE

(75) Inventors: Hoeop Yoon, Seoul (KR); Sejong Kim, Seoul (KR); Jeongho Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 246 days.

(21) Appl. No.: 13/073,416

(22) Filed: Mar. 28, 2011

(65) Prior Publication Data

US 2011/0239238 A1  Sep. 29, 2011

(30) Foreign Application Priority Data

Mar. 29, 2010  (KR) .................. 10-2010-0027877
Apr. 15, 2010  (KR) .................. 10-2010-0034967

(51) Int. Cl.
*G11B 17/028* (2006.01)

(52) U.S. Cl.
USPC ........................................... 720/697

(58) Field of Classification Search
USPC ......................... 720/671, 672, 697
See application file for complete search history.

(56) References Cited

U.S. PATENT DOCUMENTS

| 7,496,940 | B2* | 2/2009 | Wang ............................. | 720/697 |
| 7,853,966 | B2* | 12/2010 | Wang et al. ..................... | 720/671 |
| 2004/0255316 | A1* | 12/2004 | Ryu .............................. | 720/672 |
| 2008/0109836 | A1* | 5/2008 | Kirihara ......................... | 720/697 |
| 2011/0219390 | A1* | 9/2011 | Yoon et al. ..................... | 720/661 |
| 2011/0239239 | A1* | 9/2011 | Yoon et al. ..................... | 720/697 |

* cited by examiner

*Primary Examiner* — Angel Castro
(74) *Attorney, Agent, or Firm* — Saliwanchik, Lloyd & Eisenschenk

(57) ABSTRACT

An integrated disk driving module is disclosed, the module including a base unit including an opening-formed upper plate, a lateral surface plate bent from an edge of the upper plate to form an accommodation space, and a stepping motor fixture bent from the upper plate toward the accommodation space, wherein the stepping motor fixture is integrally formed with the upper plate; and a stepping motor including a lead screw and a pivot member arranged at a distal end of the lead screw and coupled to the stepping motor fixture, and wherein the stepping motor fixture is formed with an insertion groove into which the pivot member is secured, where width of the insertion groove is larger than a diameter of the pivot member.

23 Claims, 6 Drawing Sheets

INTEGRATED DISK DRIVING MODULE

CROSS-REFERENCE TO RELATED APPLICATIONS

This application claims the benefit under 35 U.S.C. §119 of Korean Application Nos. 10-2010-0027877, filed Mar. 29, 2010 and 10-2010-0034967, filed Apr. 15, 2010, which are hereby incorporated by reference in their entirety.

BACKGROUND OF THE DISCLOSURE

1. Field of the Invention

The present disclosure relates to an integrated disk driving module.

2. Description of Related Art

In general, an ODD (Optical Disk Driver) stores huge data on a disk, and reads the data stored in the disk.

The ODD largely includes a base body, a spindle motor coupled to the base body via a coupling screw, a stepping motor coupled to the base body via a coupling screw, and an optical pickup module storing data on a disk or reading the data from the disk.

The spindle motor is coupled to the base body via a mounting plate, and rotates an optical disk for storing data or an optical disk stored with data at a high speed.

The stepping motor is coupled to the base body via a mounting plate, and feeds the optical pickup module to a radial direction of the optical disk.

The optical pickup module is coupled to a guide shaft coupled to the base body via a coupling screw and slides along the guide shaft by rotation of a lead screw of the stepping motor. The optical pickup module slides along the guide shaft to store data on the optical disk and reads the data stored in the optical disk.

A guide shaft of the optical disk driver is supported in the shape of being straddled on a sill formed at a base unit, or secured to a base body by a separate leaf spring member. Meanwhile, a spindle motor and a stepping motor are connected to a main board, not by a hardened PCB, but by a FPCB (Flexible Printed Circuit Board) due to a structural problem.

A stepping motor of an optical disk driver according to prior art is coupled to a base body via a mounting plate and a coupling screw, and an optical pickup module is coupled to a guide shaft coupled to a base body via a coupling screw to disadvantageously increase the number of parts comprising the optical disk driver.

The conventional optical disk driver is also disadvantageous in that the number of parts increases to take many hours for assembly.

The conventional optical disk driver is further disadvantageous in that product accuracy decreases due to manufacturing tolerances of the base body and the stepping motor.

The conventional optical disk driver is still further disadvantageous in that the stepping motor is coupled to the base body via a coupling screw to result in frequent poor assembly in which the stepping motor is not mounted at a designated position, and a lead screw of the stepping motor and a guide shaft of optical pickup module are not arranged in parallel to frequently result in poor assembly.

The conventional optical disk driver is still further disadvantageous in that a mounting plate for coupling the stepping motor to the base body is needed to increase size and weight of the optical disk apparatus and to be prone to external shock.

The conventional optical disk apparatus is still further disadvantageous in that a Flexible Printed Circuit Board (FPCB) fails to be secured to an inside of the optical disk apparatus to get damaged during a long time of use or during maintenance process, if a sill or a separate leaf spring member is used to secure a guide shaft to a base body.

The conventional optical disk driver is still further disadvantageous in that the FPCB is damaged by interference between the FPCB and a screw bolt, and a peripheral apparatus of the FPCB or the FPCB itself is damaged in the course of coupling the screw bolt, in view of the fact that a fixing method is employed using a screw bolt in case a leaf spring member is used to couple a guide shaft to a base body.

BRIEF SUMMARY

The present disclosure is to provide an integrated disk driving module configured to reduce the number of parts by integrally forming a stepping motor to a base unit, to reduce assembly time as a result of reduced number of parts, to improve product performance as a result of reduced assembly tolerances, to inhibit incomplete assembly by arranging a spindle motor at a designated position, to reduce size and weight, and to adjust a guide shaft sliding an optical pickup module and a parallelism of a lead screw.

An object of the present disclosure is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present disclosure, there is provided an integrated disk driving module, the module comprising: a base unit including an opening-formed upper plate, a lateral surface plate bent from an edge of the upper plate to form an accommodation space, and a stepping motor fixture bent from the upper plate toward the accommodation space, wherein the stepping motor fixture is integrally formed with the upper plate; and a stepping motor including a lead screw and a pivot member arranged at a distal end of the lead screw and coupled to the stepping motor fixture, and wherein the stepping motor fixture is formed with an insertion groove into which the pivot member is secured, where width of the insertion groove is larger than a diameter of the pivot member.

Technical problems to be solved by the present disclosure are not restricted to the above-mentioned, and any other technical problems not mentioned so far will be clearly appreciated from the following description by those skilled in the art.

DETAILED DESCRIPTION

Figure 1:
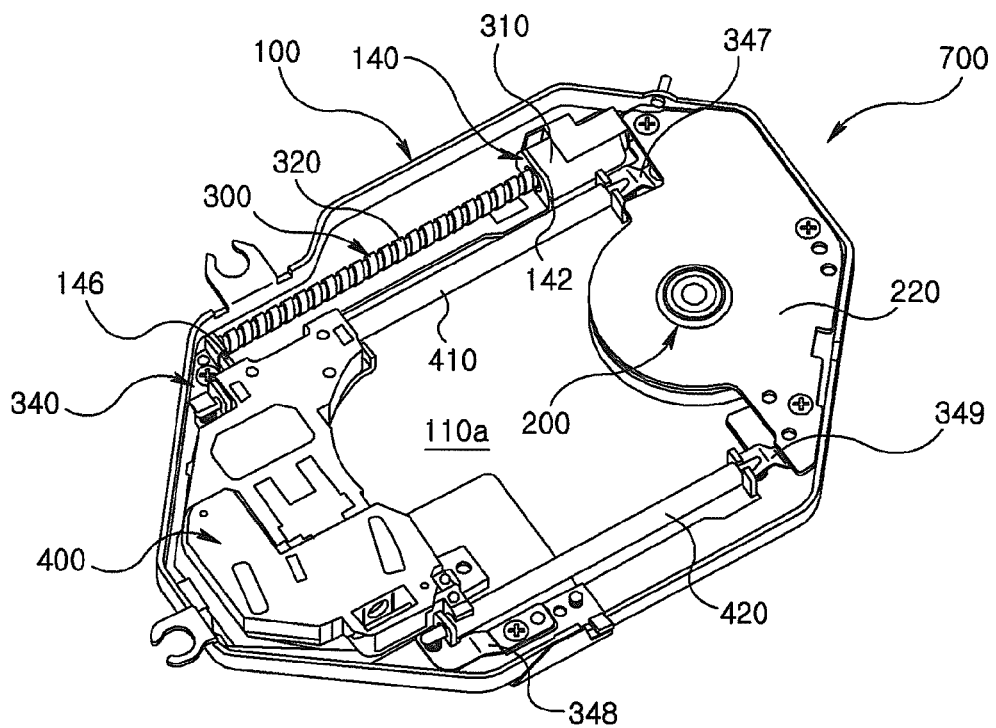
FIG. 1 is a rear perspective view of an integrated disk driving module according to an exemplary embodiment of the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application (s) or use(s) of the present invention.

The disclosed embodiments and advantages thereof are best understood by referring to FIGS. 1-9 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

Now, the present invention will be described in detail with reference to the accompanying drawings.

Figure 2:
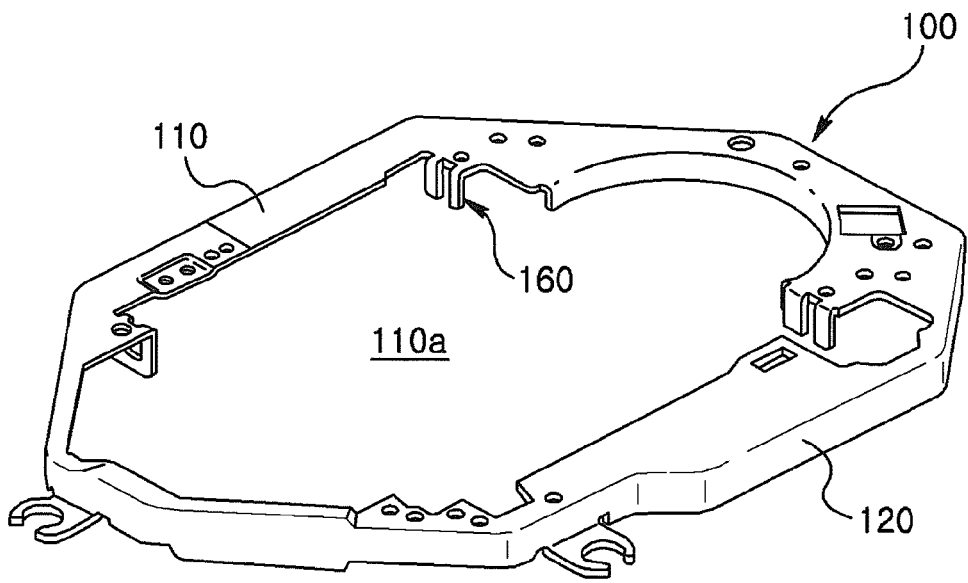
FIG. 2 is a front perspective view of a base unit of FIG. 1.
Figure 3:
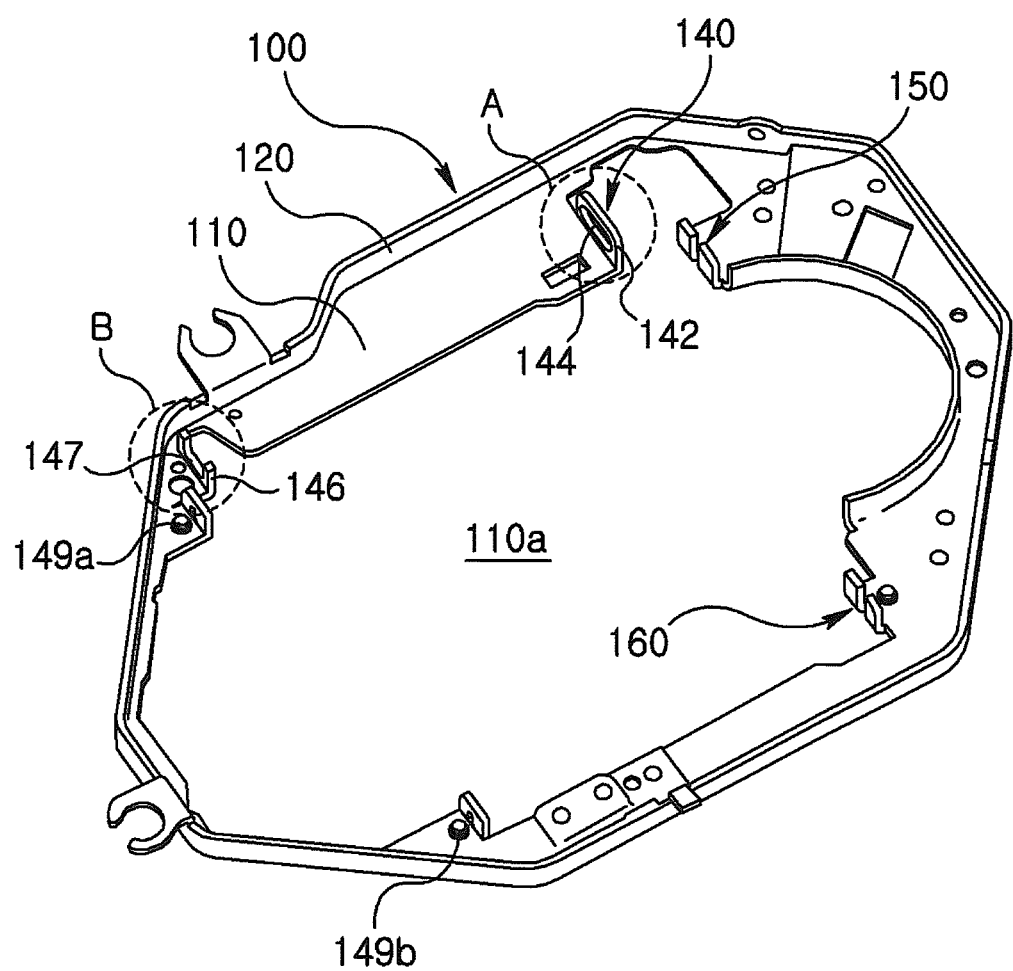
FIG. 3 is a rear perspective view of a base unit of FIG. 1.
Figure 4:
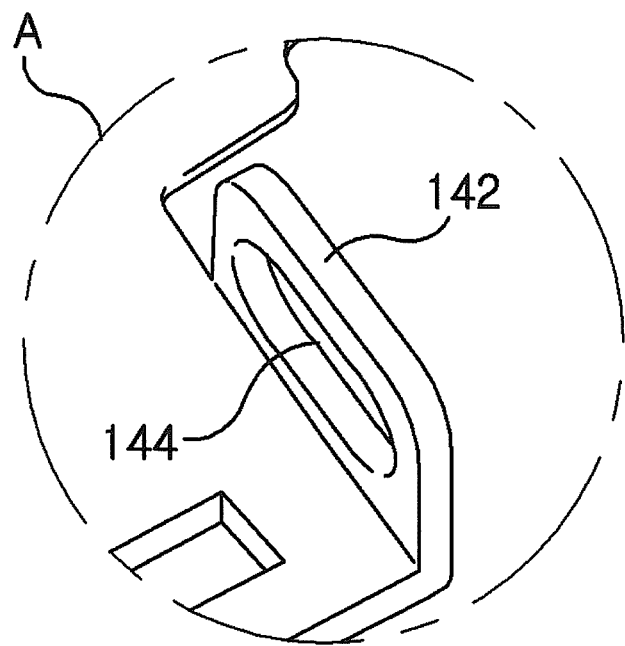
FIG. 4 is a partially enlarged view of 'A' portion of FIG. 3.
Figure 5:
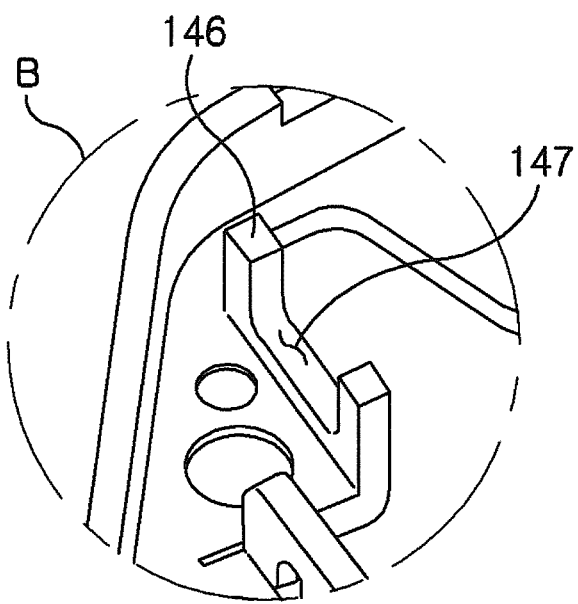
FIG. 5 is a partially enlarged view of 'B' portion of FIG. 3.

FIG. 1 is a rear perspective view of an integrated disk driving module according to an exemplary embodiment of the present invention, FIG. 2 is a front perspective view of a base unit of FIG. 1, FIG. 3 is a rear perspective view of a base unit of FIG. 1, FIG. 4 is a partially enlarged view of 'A' portion of FIG. 3, and FIG. 5 is a partially enlarged view of 'B' portion of FIG. 3.

Referring to FIG. 1, an integrated disk driving module (700) may include a base unit (100), a spindle motor (200) and a stepping motor (300). The integrated disk driving module (700) may further include an optical pickup module (400).

Referring to FIG. 2, the base unit (100) includes an upper plate (110), a lateral surface plate (120) and a stepping motor fixture (140). The base unit (100) may further include first and second guide shaft fixtures (150, 160).

The upper plate (110) includes a metal plate, and is centrally formed with an opening (110*a*), and part of the opening (110*a*) on the upper plate (110) may take the shape of a half circle, when viewed from a plane, in order to the spindle motor (described later).

The opening (110*a*) formed upper plate (110) may take the shape of an octagonal plate when viewed from a plane. Although the present exemplary embodiment of the present disclosure describes the upper plate (110) of an octagonal plate, the shape of the upper plate (110) may take various shapes based on arrangement and shape of the spindle motor (200, described later), the stepping motor (300) and the optical pickup module (400).

The lateral surface plate (120) is bent from an edge of the upper plate (110) to one direction of the upper plate (110), and an accommodation space is formed at the base unit (100) by the upper plate (110) and the lateral surface plate (120). In the present exemplary embodiment, the lateral surface plate (120) is formed perpendicularly to the upper plate (110), for example.

Referring to FIGS. 3 to 5, the stepping motor fixture (140) functions to secure the stepping motor (300, described later) to the base unit (100). In the present exemplary embodiment, the stepping motor fixture (140) is integrally formed with upper plate (110).

The stepping motor fixture (140) integrally formed with the upper plate (110) is bent in a pair from the upper plate (110) to the accommodation space, and each of the bent pair of stepping motor fixtures (140) faces the other stepping motor fixture (140) in the accommodation space, each fixture spaced apart from the other fixture at a predetermined distance.

Hereinafter, the pair of stepping motor fixtures (140), each facing the other, is defined as a first fixture (142) and a second fixture (146), where the first and second fixtures (142, 146) are formed in parallel.

Referring to FIG. 4, the first fixture (142) is bent from the upper plate (110) to the accommodation space, and may be perpendicularly bent relative to the upper plate (110). The first fixture (142) is centrally formed with a round through hole (144).

Meanwhile, the through hole (144) formed at the first fixture (142) may take the shape of an oblong or a slit, in addition to the round shape. The through hole (144) is passed by a lead screw included in the stepping motor (300, described later) to rotatably support a lateral portion of the lead screw by the first fixture (142). In the present exemplary embodiment, the through hole (144) has a width greater than a diameter of the lead screw (described later), in case the through hole (144) formed at the first fixture (142) takes the shape of an oblong or a slit.

Referring to FIG. 5, the second fixture (146) facing the first fixture (142) is bent from the upper plate (110) to the accommodation space, and may be perpendicularly bent relative to the upper plate (110), for example.

An upper surface of the second fixture (146) bent from the upper plate (110) is formed with a concavely formed insertion groove (147) toward a bottom surface facing the upper surface from the upper surface of the second fixture (146). The insertion groove (147) formed at the second fixture (146) is coupled to a pivot member coupled to a distal end of the lead screw, which is a part of the stepping motor (300, described later).

Width of the insertion groove (147) formed at the second fixture (146) is greater than a diameter of the lead screw (described later). In case the width of the insertion groove (147) formed at the second fixture (146) is greater than a diameter of the lead screw (described later), position of the pivot member coupled to the lead screw can be variably changed for accurate adjustment of parallelism between the lead screw and a first guide fixture (described later) using a jig.

Although the present exemplary embodiment of the present disclosure has described and explained that the insertion groove (146) is formed at the second fixture (146) having a width greater than the diameter of the lead screw, it will be appreciated that the implementation may be carried out differently, and other types of insertion groove (146) may also be utilized.

For example, the first fixture (142) may be formed with an insertion groove having a width greater than a diameter of the lead screw, and the second fixture (146) may be formed with a round through hole or an oblong through hole. In another example, each of the first and second fixtures (142, 146) may be formed with a round through hole (144) or an oblong through hole (144), or with an insertion groove (146) having a width greater than a diameter of the lead screw.

Referring to FIG. 3 again, the upper plate (110) is formed with first and second guide shaft fixtures (150, 160) for securing first and second guide shafts (described later). The first and second guide shaft fixtures (150, 160) are respectively formed at either side of the upper plate (110) at the base unit (100).

The first guide shaft fixture (150) is integrally formed with the upper plate (110) of the base unit (100), and functions to secure a first guide shaft (410, see FIG. 6) of the optical pickup module (400, described later) to the base unit (100). The first guide shaft fixture (150) is formed near to the first and second fixtures (142, 146).

The first guide shaft fixture (150) is formed on the upper plate (110) of the base unit (100) in a pair, each facing the other, and each of the pair of first guide shaft fixture (150) is bent from the upper plate (110) to the accommodation space, and the first guide shaft fixtures (150) are arranged in parallel with the first fixture (142) and the second fixture (146) of the stepping motor fixture (140). The first guide shaft fixtures (150) are integrally formed with the upper plate (110).

The first guide shaft fixture (150) arranged near to the first fixture (142) of the stepping motor fixture (140) in the pair of first guide shaft fixtures (150) is formed with an insertion groove into which a first distal end (411, see FIG. 6) of the first guide shaft (410, described later) is inserted. The insertion groove of the first guide shaft fixture (150) may have the same size of diameter as that of the first distal end (411) of the first guide shaft (410). Alternatively, the insertion groove of the first guide shaft fixture (150) may have a width greater than the diameter of the first distal end (411) of the first guide shaft (410), where the parallelism between the lead screw and the first guide shaft (410) can be precisely adjusted using the insertion groove of the first guide shaft fixture (150).

Meanwhile, the other remaining first guide shaft fixture (150) arranged near to the second fixture (146) of the stepping motor fixture (140) is formed with a through hole into which a second distal end (412, see FIG. 6) facing the first distal end of the first guide shaft (described later) passes.

In the present exemplary embodiment, the through hole for passing the second distal end of the first guide shaft (410) may take the shape of an oblong, a circle or a slit. The oblong or slit-shaped second distal end (412) of the first guide shaft (410) can further precisely adjust the parallelism of the first guide shaft (410) and the lead screw.

Positions on the upper plate (110) corresponding to those of the first and second distal ends (411, 412) of the first guide shaft (410) protruded outward of the first guide shaft fixture (150) are respectively formed with coupling holes, where each coupling hole is formed with a height adjustment screw (149a). The height adjustment screw (149a) adjusts a height of the first guide shaft (410) relative to the upper plate (110).

The second guide shaft fixture (160) arranged in parallel with the first guide shaft fixture (150) is formed at the upper plate (110) of the base unit (100), and functions to secure the second guide shaft (420, see FIG. 6, described later) to the upper plate (110) of the base unit (100).

The second guide shaft fixture (160) is formed on the upper plate (110) of the base unit (100) in a pair, each facing the other, and each of the pair of second guide shaft fixture (160) is bent from the upper plate (110) to the accommodation space, and the second guide shaft fixtures (160) are arranged in parallel with the first guide shaft fixture (150), and the first and second fixtures (142, 146) of the stepping motor fixture (140).

One of the pair of second guide shaft fixtures (160) is formed with an insertion groove into which a third distal end (421, see FIG. 6) of the second guide shaft (420, described later). The insertion groove for inserting the third distal end (421) of the second guide shaft (420) may have the same size of diameter as that of the third distal end. Alternatively, the insertion groove for inserting the third distal end (421) of the second guide shaft (420) may have a width greater than the diameter of the third distal end.

The remaining one of the second guide shaft fixture (150) in the second guide shaft fixtures (150) is formed with a through hole through which a fourth distal end (422, see FIG. 6) facing the third distal end of the second guide shaft (420, described later) passes. In the present exemplary embodiment, the through hole for passing the fourth distal end (422) of the second guide shaft (420) may take the shape of an oblong, or a slit.

Positions on the upper plate (110) of the base unit (100) corresponding to those of the third and fourth distal ends (421, 422) of the second guide shaft (420) protruded outward of the second guide shaft fixtures (160) are respectively formed with coupling holes, where each coupling hole is formed with a height adjustment screw (149b). The height adjustment screw (149b) adjusts a height between the second guide shaft (420) and the upper plate (110).

Referring to FIGS. 1 and 2 again, the spindle motor (200) is mounted at a part of an opening semi-circularly formed at the upper plate (110) of the base unit (100).

The spindle motor (200) is coupled to a mounting plate (220), which is in turn coupled to the upper plate (110) of the base unit (100) by a plurality of coupling screws.

The spindle motor (200) in the present exemplary embodiment of the present disclosure may have various configurations and should not be limited thereto in configurations.

Figure 6:
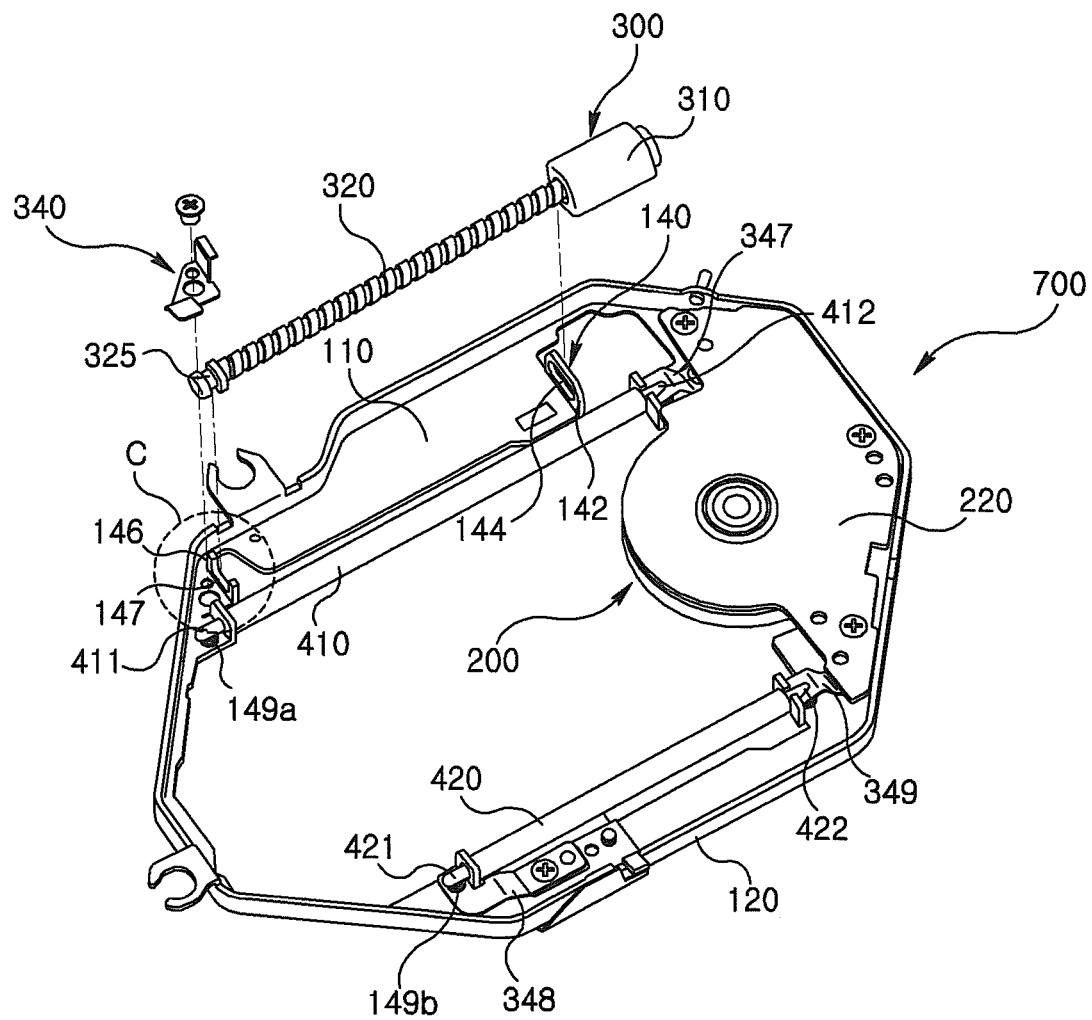
FIG. 6 is an exploded perspective view a base unit of FIG. 3 and a stepping motor coupled to the base unit.
Figure 7:
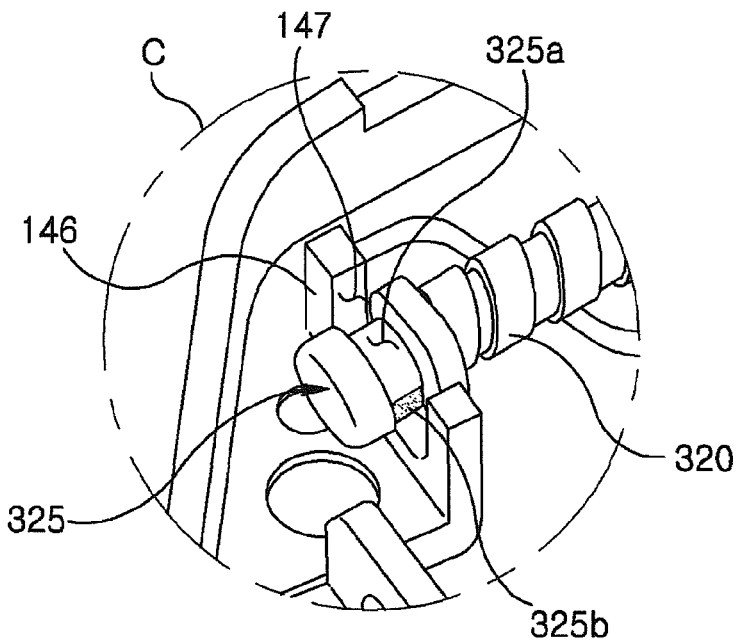
FIG. 7 is a partially enlarged view of 'C' portion of FIG. 6.

FIG. 6 is an exploded perspective view a base unit of FIG. 3 and a stepping motor coupled to the base unit, and FIG. 7 is a partially enlarged view of 'C' portion of FIG. 6.

Referring to FIGS. 6 and 7, the first and second fixtures (142, 146) of the stepping motor fixture (140) of the base unit (100) is coupled by the stepping motor (300). The stepping motor (300) includes a stepping motor body (310), a lead screw (320) and a pivot member (325).

The stepping motor body (310) includes a stator (not shown) and the lead screw (320) is rotated in association with the stator. The stepping motor body (310) and the lead screw (320) in the present exemplary embodiment of the present disclosure may have various configurations and the stepping motor body (310) should not be limited in configuration.

The lead screw (320) is formed in the radial direction of an optical disk (not shown) secured at the spindle motor (200).

One lateral portion of the lead screw (320) is rotatably supported by the first fixture (142) of the stepping motor fixture (140) through the through hole (144) of the first fixture (142), and the other lateral portion of the lead screw facing the one lateral portion of the lead screw is arranged on the insertion groove (147) of the second fixture (146) of the stepping motor fixture (140).

The pivot member (325) is coupled to the other side of the lead screw (320) and is secured to the insertion groove (147) of the second fixture (146) of the stepping motor fixture (140). The pivot member (325) takes the shape of a cylinder, and is formed at a periphery thereof with a groove (325a) into which the insertion groove (147) is coupled to thereby inhibit the pivot member (325) from being disengaged from the insertion groove (147).

The pivot member (325) and the second fixture (146) are secured by a fixture member (325b) in order to inhibit the pivot member (325) coupled to the insertion groove (147) from being moved or disengaged from the second fixture (146). The fixture member (325b) in the present exemplary embodiment may be an adhesive.

Referring to FIG. 6 again, the pair of first guide shaft fixtures (410) is respectively coupled by the first and second distal ends (411, 412) of the first guide shaft (410), and the pair of second guide shaft fixtures (420) is respectively coupled by the third and fourth distal ends (421, 422) of the second guide shaft (420).

Referring to FIG. 1 again, the integrated disk driving module (700) may include an optical pickup module (400). The optical pickup module (400) is reciprocated along a radial direction of a disk secured to the spindle motor (200) by the lead screw (320) of the stepping motor (300) secured on the upper plate (110) of the base unit (100) and the first and second guide shafts (410, 420) arranged in parallel with the lead screw (320).

Referring to FIG. 6 again, the first distal end (411) of the first guide shaft (410) is arranged with a first pressure member (340), and the second distal end (412) is arranged with a second pressure member (347) in order to inhibit the first and second distal ends (411, 412) of the first guide shaft (410) from being disengaged and moved.

The third distal end (421) of the second guide shaft (420) is arranged with a third pressure member (348), and the fourth distal end (422) is arranged with a fourth pressure member (349) in order to inhibit the third and fourth distal ends (421, 422) of the second guide shaft (420) from being disengaged and moved.

Each of the first to fourth pressure members (340, 347, 348, 349) takes the shape of a leaf spring, and each one distal end of the first to fourth pressure members (340, 347, 348, 349) is secured to the upper plate (110), and each other distal end of the first to fourth pressure members (340, 347, 348, 349) facing the one distal end applies pressure to the first to fourth distal ends (411, 412, 421, 422).

Meanwhile, as illustrated in FIG. 1, the pivot member (325) secured to the second fixture (146) of the stepping motor fixture (140) and the first distal end (411) of the first guide shaft (410) coupled to the first guide shaft fixture (150) are closely arranged therebetween, such that the pivot member (325) and the first distal end (411) of the first guide shaft (410) may be simultaneously applied with pressure by one pressure member (340).

To this end, the pressure member (340) in the present disclosure may include a body (342), a first pressure unit (344) and a second pressure unit (346).

The body (342) takes the shape of a plate, is secured to the upper plate (110) of the base unit (100) by a coupling screw. The first pressure member (344) is extended and bent from the body (342) to apply pressure to the pivot member (325). The second pressure member (346) is extended and bent from the body (342) to apply pressure to the distal end (411) of the first guide shaft (410).

There is an advantage in the exemplary embodiment of the present disclosure in that an axial parallelism of the lead screw (320) and the second fixture (146) can be markedly increased by forming a width of the insertion groove (147) formed at the second fixture (146) of the stepping motor fixture (140) securing the lead screw (320) of the stepping motor (300) greater than a diameter of the lead screw (320) to cause the lead screw (320) to move, and adjusting a parallelism of the lead screw (320) and the first guide shaft fixture (410) arranged near to the lead screw (320) using a jig to fix the pivot member (325) secured at the lead screw (320) and the second fixture (146) using an adhesive.

Figure 8:
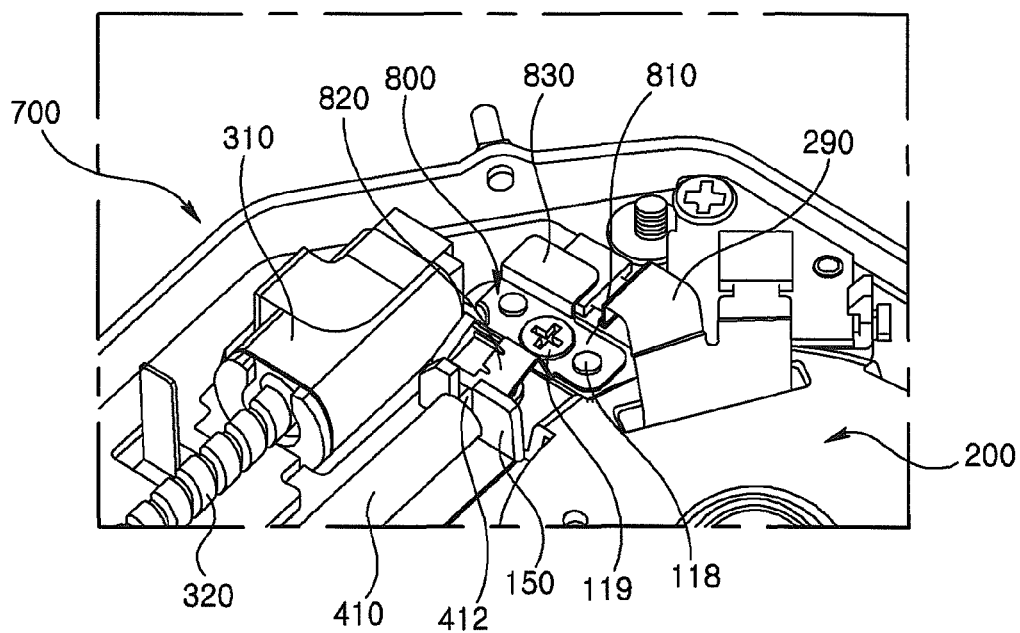
FIG. 8 is a partially cut-out perspective view illustrating a first guide shaft of an integrated disk driving module and a plate spring securing a flexible circuit substrate according to an exemplary embodiment of the present invention.
Figure 9:
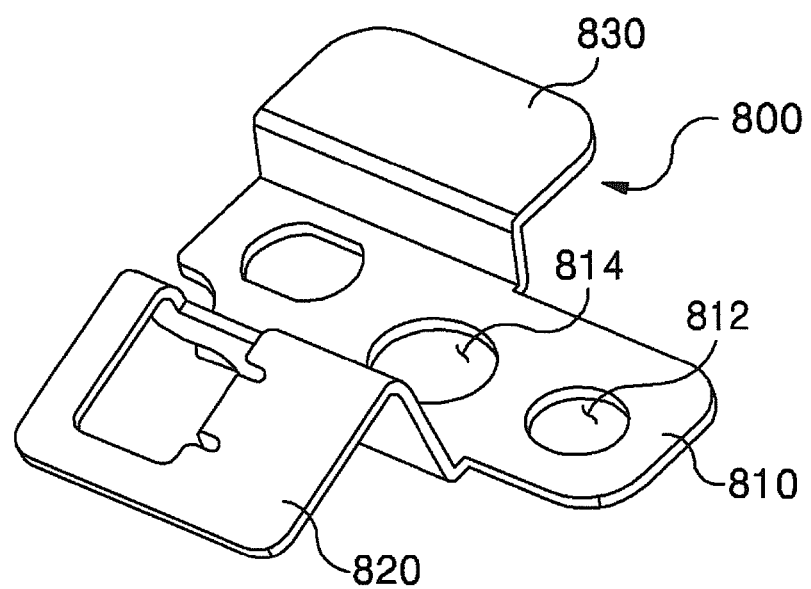
FIG. 9 is a perspective view illustrating a plate spring of FIG. 8.

FIG. 8 is a partially cut-out perspective view illustrating a first guide shaft of an integrated disk driving module and a plate spring securing a flexible circuit substrate according to an exemplary embodiment of the present invention, and FIG. 9 is a perspective view illustrating a plate spring of FIG. 8.

FIGS. 8 and 9, a main board of the integrated disk driving module (700) is connected by the spindle motor (200) and the stepping motor (300), and the main board, the spindle motor (200) and the stepping motor (300) are electrically connected by a flexible circuit substance (290). At this time, the flexible circuit substance (290) is not fixed and may be damaged if moved for a long time.

The integrated disk driving module (700) is coupled by a plate spring (800) in order to secure the flexible circuit substance (290) and to secure the first guide shaft (410).

The plate spring (800) includes a base (810), an elastic bent unit (820) and a protection unit (830). In present exemplary embodiment, the plate spring (800) may be disposed between the second distal end (422) of the first shaft (410) and the flexible circuit substance (290), for example.

The base (810) takes the shape of a plate and is formed with a fixture hole (812) and a coupling hole (814). In the present exemplary embodiment, the coupling hole (814) may be centrally disposed at the base (810), and the fixture hole (812) may be formed at either side of the coupling hole (814).

The base (810) and the upper plate (110) are coupled through the coupling hole (814) of the base (810) by a coupling screw, and a position corresponding to that of the fixture hole (812) is formed with a protruding lug (118), which is in turn coupled to the fixture hole (812). The plate spring (800) is secured to a designated place of the upper plate (110) by the coupling screw and the lug (118).

The elastic bent unit (820) is extended and/or bent from the base (810), and applies pressure to an upper surface of the second distal end (422) of the first guide shaft (410), whereby the first guide shaft (410) is elastically supported. The elastic bent unit (820) may be formed with an opening to improve the elasticity.

The protection unit (830) is extended and/or bent from the base (810) to cover at least a part of the flexible circuit substrate (290), whereby the flexible circuit substrate (290) is protected against damage. The protection unit (830) is distanced from the upper plate (110), and may be arranged in parallel with an upper surface of the flexible circuit substrate (290), for example.

As apparent from the foregoing, the integrated disk driving module according to the present disclosure has an industrial applicability in that a stepping motor fixture for mounting a lead screw of a stepping motor is formed at a base unit, and the lead screw coupled to the stepping motor is coupled to the stepping motor fixture to reduce the number of parts of the integrated disk driving module, to reduce assembly time as a result of reduced number of parts, to improve product performance as a result of reduced assembly tolerances, to inhibit incomplete assembly by arranging a spindle motor and a stepping motor each at a designated position and to reduce size and weight.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. An integrated disk driving module, the module comprising: a base unit including an opening-formed upper plate, a lateral surface plate bent from an edge of the upper plate to form an accommodation space, and a stepping motor fixture bent from the upper plate toward the accommodation space, wherein the stepping motor fixture is integrally formed with the upper plate; and a stepping motor including a lead screw and a pivot member arranged at a distal end of the lead screw and coupled to the stepping motor fixture, and wherein the stepping motor fixture is formed with an insertion groove into which the pivot member is secured, where width of the insertion groove is larger than a diameter of the pivot member.

2. The integrated disk driving module of claim 1, wherein the stepping motor fixture includes a first fixture integrally formed with the upper plate, and a second fixture discretely formed from the first fixture and arranged in parallel with the first fixture, wherein the insertion groove is formed at the second fixture.

3. The integrated disk driving module of claim 2, wherein the first fixture includes a through hole through which the lead screw passes.

4. The integrated disk driving module of claim 3, wherein the through hole is lengthily formed to a lengthwise direction of the insertion groove at the second fixture.

5. The integrated disk driving module of claim 2, further comprising a fixture member for securing the pivot member arranged inside the insertion groove of the second fixture to the insertion groove.

6. The integrated disk driving module of claim 5, wherein the fixture member includes an adhesive for adhering the pivot member and the second fixture.

7. The integrated disk driving module of claim 2, wherein a groove for inserting the second fixture is formed at a portion in the pivot member that is contacted by the insertion groove of the second fixture.

8. The integrated disk driving module of claim 2, wherein the first fixture of the stepping motor fixture includes an insertion groove into which the lead screw is inserted, where width of the insertion groove of the first fixture is greater than a diameter of the lead screw.

9. The integrated disk driving module of claim 2, further comprising first and second guide shafts coupled to the upper plate of the base unit and formed in parallel with the lead screw.

10. The integrated disk driving module of claim 9, further comprising: a pair of first guide shaft fixtures bent from the upper plate toward the accommodation space in order to secure a first distal end of the first guide shaft and second distal ends facing the first distal end; and a pair of second guide shaft fixtures bent from the upper plate toward the accommodation space in order to secure a third distal end of the second guide shaft and a fourth distal end facing the third distal end.

11. The integrated disk driving module of claim 10, wherein the one first guide shaft fixture secured to the first distal end is formed with an insertion groove into which the first distal end is inserted, and the other first guide shaft fixture secured to the second distal end is formed with a through hole through which the second distal end passes.

12. The integrated disk driving module of claim 11, wherein width of the insertion groove formed at the one first guide shaft fixture is greater than a diameter of the first distal end of the first guide shaft fixture.

13. The integrated disk driving module of claim 10, wherein the one second guide shaft fixture secured to the third distal end is formed with an insertion groove into which the third distal end is inserted, and the other second guide shaft fixture secured to the fourth distal end is formed with a through hole through which the fourth distal end passes.

14. The integrated disk driving module of claim 13, wherein width of the insertion groove formed at the one second guide shaft fixture is greater than a diameter of the third distal end of the second guide shaft fixture.

15. The integrated disk driving module of claim 10 further comprising: a first pressure member fixed at the upper plate for being contacted to the first distal end; a second pressure member fixed at the upper plate for being contacted to the second distal end; a third pressure member fixed at the upper plate for being contacted to the third distal end; and a fourth pressure member fixed at the upper plate for being contacted to the fourth distal end.

16. The integrated disk driving module of claim 15, wherein each of the first through fourth pressure members includes a leaf spring.

17. The integrated disk driving module of claim 9 further comprising an optical pickup module slidably coupled to the first and second guide shafts.

18. The integrated disk driving module of claim 10 further comprising a height adjustment screw coupled to the upper plate of the base unit to adjust heights of the first and second distal ends of the first guide shaft, and coupled to the upper plate of the base unit to adjust heights of the third and fourth distal ends of the second guide shaft.

19. The integrated disk driving module of claim 10 further comprising a pressure member including a first pressure unit that includes a body secured to the upper plate and that is extended and bent from the body to apply pressure to at least part of the pivot member, and a second pressure unit extended and bent from the body to apply pressure to the first distal end of the first guide shaft adjacent to the pivot member.

20. The integrated disk driving module of claim 1 further comprising a spindle motor secured to the upper plate.

21. The integrated disk driving module of claim 10 further comprising a flexible spring including a base secured to the upper plate formed adjacent to the first distal end, an elastic bent unit extended from the base to an upper surface of the first distal end to elastically support the first distal end, and a protection unit extended from the base to protectively cover at least a part of a flexible circuit substrate arranged near to the first distal end.

22. The integrated disk driving module of claim 21, wherein the base includes a fixture hole into which a lug protruded from the upper plate, and a coupling hole coupled to the upper plate.

23. The integrated disk driving module of claim 21, wherein the protection unit is discretely formed from an upper surface of the flexible circuit substrate and formed in parallel with the base.

* * * * *